United States Patent [19]

Portinaro

[11] 4,170,004
[45] Oct. 2, 1979

[54] DEVICE FOR MONITORING THE SERVICEABILITY OF OPTICAL INDICATORS

[75] Inventor: Santino Portinaro, Caluso, Italy

[73] Assignee: Fiat-Allis Macchine Movimento Terra S.p.A., Lecce, Italy

[21] Appl. No.: 889,388

[22] Filed: Mar. 23, 1978

[30] Foreign Application Priority Data

Apr. 8, 1977 [IT] Italy .............................. 67779 A/77

[51] Int. Cl.² .......................................... G08B 21/00
[52] U.S. Cl. .................................. 340/514; 315/135; 340/642
[58] Field of Search ................ 340/641, 642, 514; 315/120, 135

[56] References Cited

U.S. PATENT DOCUMENTS

| 2,839,741 | 6/1958 | Kratville | 340/514 |
| 3,597,729 | 8/1971 | Lopez | 340/514 X |

Primary Examiner—John W. Caldwell, Sr.
Assistant Examiner—Daniel Myer
Attorney, Agent, or Firm—August E. Roehrig, Jr.; Robert A. Brown; Harvey W. Rockwell

[57] ABSTRACT

A system for monitoring the operability of warning lamps which provide a visual signal in the event of the malfunction or unacceptable variation of a monitored function or control comprising a plurality of optical indicators or warning lamps electrically coupled to a single-control switch common to all warning lamps such that all lamps may be simultaneously illuminated upon the closing of the switch to determine their operability.

5 Claims, 4 Drawing Figures

DEVICE FOR MONITORING THE SERVICEABILITY OF OPTICAL INDICATORS

BAKGROUND OF THE INVENTION

This invention relates in general to monitoring systems and, in particular, to a monitoring system for determining the operability of visual warning indicators of the type which provide a visual signal in the event of a malfunction or variation of controlled functions of a machine from a predetermined operational range.

More specifically, but without restriction to the particular use which is shown and described, this invention relates to a system for monitoring vehicle warning lamps which are actuated in response to the detection of vehicle functions or conditions which vary from predetermined normal operational parameters.

In the operation of various machinery, for example vehicles, many operational functions such as water temperature, oil pressure, electrical current generation or hydraulic pressure must be controlled to insure safe or efficient operation. Various types of devices are available to monitor these various apparatus and systems to insure that they are functioning and controlled within operational parameters. In the event any of these operational functions or controls vary from the predetermined set parameters, the variation is detected and a signal is provided which, either visually or audibly, or both, informs the machine operator.

While such warning systems have found widespread usage, visual warning systems are especially useful in such equipment as construction machinery and earthmoving equipment. Due to the operational noises at the construction site it is preferable to provide the machine operator with a visual warning light since an audible signal may at times not be heard and, obviously, an auible warning signal alone could not be used where many controls and functions must be monitored due to the difficulties in discerning the source of the signal. While such warning lamps provide a visual warning signal for the machine operator, it is desirable and necessary to provide a monitoring system to insure that the warning lamps themselves are operable and will illuminate in the event one of the monitored functions or controls varys from the predetermined set parameters.

The present invention provides a system for monitoring the warning lamps to insure that each lamp is in proper working order and will illuminate when the machine is turned on. The invention also permits the lamps to be illuminated during machine operation to insure that they continue to be in proper working order to provide a signal in the event of any monitored function or control malfunction.

Various attempts have been made to provide a satisfactory monitoring system for use with visual warning lamps, especially with warning lamp systems that are utilized in construction machinery or earthmoving equipment vehicles. Since such vehicles are used under extremely adverse environmental conditions, such as when operated in dirt, sand, mud, dust, etc., systems which have utilized relay switches to energize or illuminate the warning lamps for detecting any inoperable indicator lamps have not been satisfactory.

The use of such relay switches, especially when utilized in construction machinery or earthmoving equipment operating under such adverse environmental conditions, presents many problems. One problem associated with such prior art devices results from the high mechanical stresses and loading which occurs due to operational conditions wherein the vehicle components are subjected to high impact and vibrations. Such impact and vibrations cause the windings of the relay switch excitation coil to break, thus rendering the switch inoperative and, therefore, the system ineffective. In addition, the impacting and vibration occurring during operation of the vehicle can cause oscillation of the relay contacts resulting in an unstable and uncontrolled opening and closing of the relay contacts creating erratic responses in the system. Since these vehicles are operated under such adverse environmental conditions, the contacts of the relay switches become corroded and pitted due to this dust and dirt laden atmosphere which causes the relay contacts to wear giving need to frequent and costly maintenance of the devices as well as being another source of erratic operation. Furthermore, the complexity of the electrical couplings necessitated by the use of relay switches and their supporting attachment to the vehicle adds to the cost and complexity of the system.

SUMMARY OF THE INVENTION

It is, therefore, an object of this invention to improve systems for monitoring the operability of warning lamp indicators which provide a signal responsive to a monitored control or functions variation from predetermined parameters.

Another object of this invention is to improve visual warning lamp monitoring system by simplifying the components and electrical circuitry to minimize system malfunction.

A further object of this invention is to provide a simple, visual, malfunction detecting system for warning lamps to insure operability of the warning lamps at all times during machine operation.

These and other objects are attained in accordance with the present invention wherein there is provided various embodiments of a system for monitoring the operability of warning lamps which provide a visual signal in the event of the malfunction or unacceptable variation of a monitored function or control comprising a plurality of optical indicators or warning lamps electrically coupled to a single-control switch common to all warning lamps such that all lamps may be simultaneously illuminated upon the closing of the switch to determine their operability.

DESCRIPTION OF THE DRAWINGS

Further objects of the invention together with additional features contributing thereto and advantages accruing therefrom will be apparent from the following description of preferred embodiments of the invention which are shown in the accompanying drawings with like reference numerals indicating corresponding parts throughout, wherein.

DESCRIPTION OF THE PREFERRED EMBODIMENTS OF THE INVENTION

Figure 1:
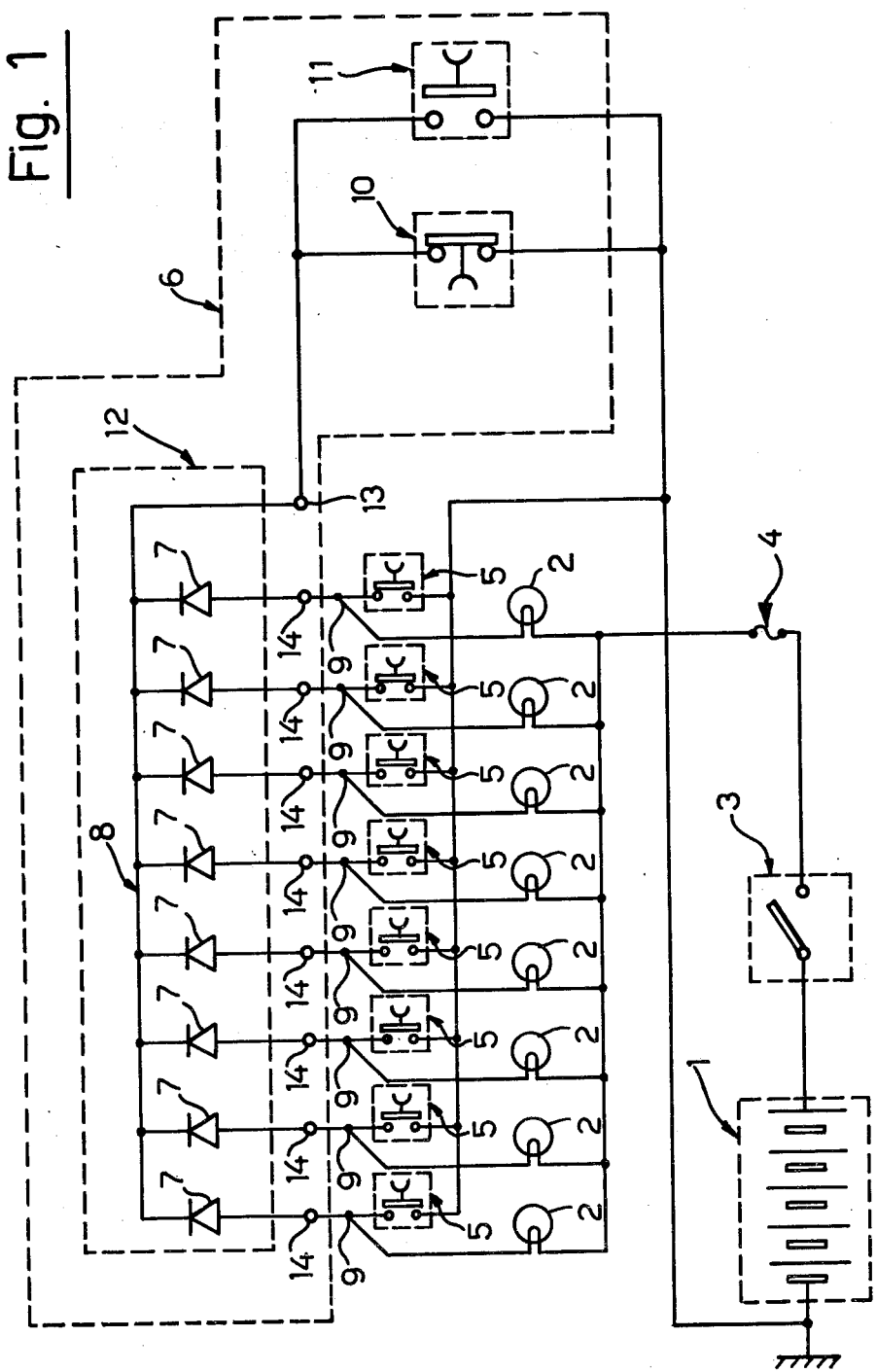
FIG. 1 is an electrical schematic diagram illustrating one embodiment of the invention.

Referring now to the electrical schematic shown in FIG. 1, there is shown a battery 1 of the type found in the electrical system of a vehicle provided with warning lamps or optical indicators 2 which function to signal a variation of a vehicle function or control from predetermined limits or parameters.

Figure 2:
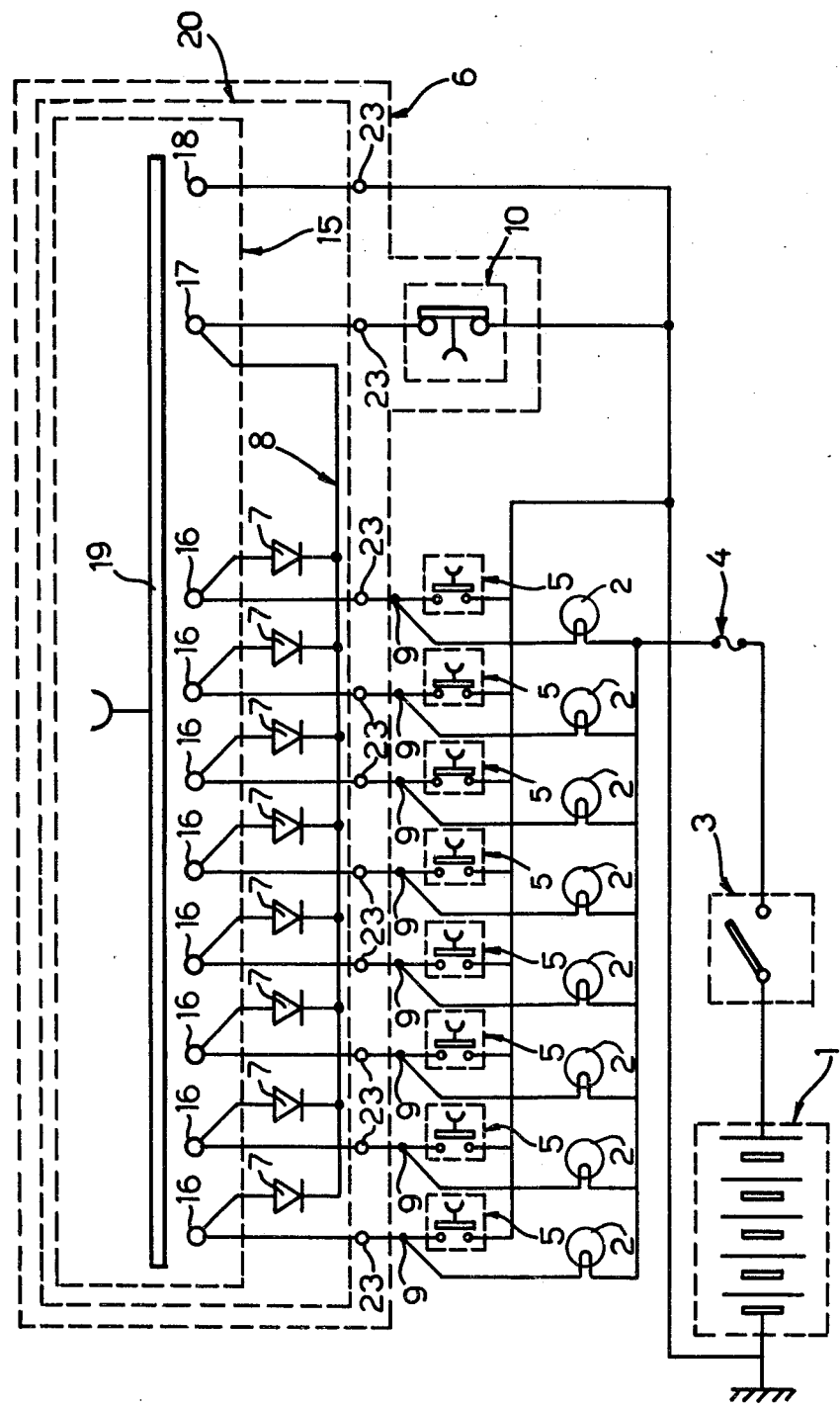
FIG. 2 is an electrical schematic diagram illustrating a second form of the invention.

The battery 1 is connected with its negative terminal grounded and provides, through a vehicle ignition switch 3 and a protective fuse 4, a power supply to the warning lamps or optical indicators 2 which are electrically coupled in parallel. Each of the individual warning lamps or optical indicators 2 is connected in series with a normally open function control switch 5 which is closed whenever a sensor or function monitoring device positioned to monitor a vehicle function or control (not shown) indicates that the monitored vehicle function or control is varying from the predetermined limits or parameters. In the event that a monitor control or function varies from these predetermined limits, the corresponding function control switch 5 is automatically closed to thereby illuminate a warning lamp through the completion of an electrical circuit as shown in FIGS. 1 or 2.

The system for monitoring the operability of the warning lamps or optical indicators 2 is generally described with reference to numeral 6 and includes a plurality of diodes 7 each one of which is individually connected with its cathode to an electrical lead 8 common to all diodes. The anode of each diode 7 is electrically coupled to a lead 9 for electrically coupling an optical indicator or warning lamp 2 to one terminal of each of the normally open function control switches 5. A normally closed circuit control switch 10 is provided in series between the battery ground and the lead 8 to which the cathode of each diode 7 is electrically coupled. As long as the circuit control switch 10 is closed a circuit will be completed through all of the warning lamps 2 when the general or ignition switch 3 is closed.

During vehicle start up, prior to starting the vehicle engine, the circuit control switch 10 is closed. When the ignition switch 3 is closed all lamps 2 will light. When the vehicle engine is started, the circuit control switch 10 automatically goes to an open position, in response to engine operation, and remains open as long as the engine is running. Therefore, the power supply to the warning lamps 2 is terminated, turning off the lamps.

In order to test the operability of the warning lamps 2 during vehicle or vehicle engine opertion, a normally open test switch 11 provided with a push button for selective closing, is electrically connected in parallel with the circuit control switch 10 and coupled between the common diode lead 8 and ground. In operation, when the ignition switch 3 is closed, all of the warning lamps or optical indicators 2 are automatically illuminated by the circuit to battery 1 through the diodes 7, the common electrical lead 8 and the contacts of the circuit control switch 10 which is closed at this time. The failure of an optical indicator or warning lamp 2 to illuminate at this time would automatically show its inoperability. When the vehicle engine is subsequently started, the normally closed contacts of circuit control switch 10 will open thereby opening the circuit to the indicator lamps 2 and terminating their illumination. During operation of the vehicle, testing of the indicator lamps 2 can be effected by closing the contacts of the test switch 11, for example, by a push button which will then complete the circuit from the battery 1 through the diodes 7 and indicator lamps 2 to illuminate the lamps for testing their operability.

Referring now to the embodiment shown in FIG. 2, the battery 1, ignition switch 3, fuse 4, optical indicator or warning lamps 2, sensor switches 5, and leads 9 are all connected in the same manner as described with reference to the electrical schematic illustrated by FIG. 1. However, a test switch, generally indicated by reference numeral 15, which has a plurality of fixed contacts 16, 17 and 18 is electrically coupled into a circuit such that by the operation of a normally open movable push-button contact 19, the circuit may be completed to electrically couple the fixed contacts to the battery 1. Both the contacts 17 and 18 are coupled to ground while each of the contacts 16, associated with each individual one of the indicator lamps 2 and the function control switches 5, are each connected to the anode of a diode 7 associated with each warning lamp and switch system.

In operation, the system described with reference to FIG. 2 works in a manner similar to that of the system illustrated in and described with reference to the electrical schematic illustrated by FIG. 1 as far as the automatic monitoring of the warning lamps indicators 2 through the engine operated circuit control switch 10. To test the operability of the indicator lamps 2 while the vehicle engine is operating, the movable push-button contact 19, which is normally open, is closed to electrically couple each of the contacts 16 with contacts 17 and 18 thereby completing an electrical circuit to illuminate all of the optical indicators or warning lamps 2.

While each of the systems described in the electrical schematics of FIGS. 1 and 2 may be embodied mechanically in a suitable switching apparatus, for example, with reference to the system illustrated in and described with reference to FIG. 1 the diode 7 and electrical contact lead 8 may be contained in a container 12 which is provided with terminals 13 and 14. The terminal 13 is electrically coupled to the lead 8 and terminal 14 is connected to each one of the diodes 7. For convenience of illustration, a mechanical switch assembly embodying the system illustrated in and described with reference to FIG. 2 will be described in detail.

Figure 3:
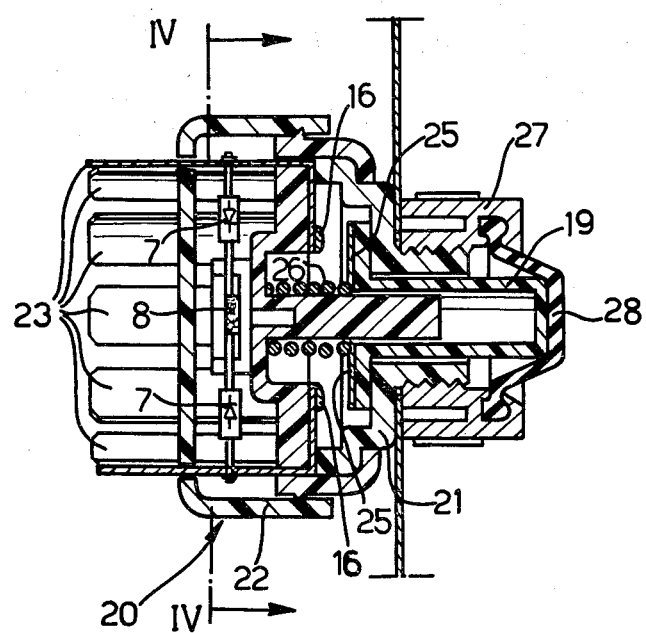
FIG. 3 is an axial sectional view of a switch constructed in accordance with the electrical schematic illustrated in FIG. 2.
Figure 4:
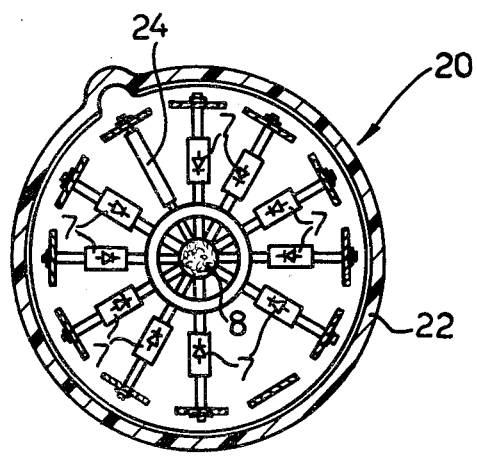
FIG. 4 is a transverse section of the switch shown in FIG. 3 taken along lines 4—4.

As illustrated in FIGS. 2, 3 and 4, the switch 15, diodes 7, and electrical contact lead 8 are contained in a suitable housing or container 20 which secures these components into position and electrically isolates them from undesirable electrical interference as well as protecting them from mechanical damage. The container 20, best illustrated in FIGS. 3 and 4, comprises, generally, a closed cup-shaped protective body 21 of an electrically insulating material, in which are supported a plurality of fixed contacts 16, 17 and 18 which extend from within the housing 21 outwardly through the outer walls of another enclosing cup-shaped housing 22, such that the terminal end portions of said contacts are formed as a plurality of flat pins 23 to facilitate insertion into an electrical power supply or circuit. The flat contactors 23 electrically connect the fixed contacts 16, 17 and 18 to provide appropriate electrical coupling with the optical indicators or warning lamps 2.

The diodes 7, are carried within the second cup-shaped body 22, which encloses a portion of housing 21, and are electrically connected at their anodes to the flat terminal pins 23 which are disposed in a generally star shape about a common electrical contact node or lead 8.

The common electrical contact node 8 is electrically coupled directly to one of the terminal pins 23 through an electrical conductor lead 24. The push-button contact 19, carries a movable contact 25 which is normally maintained in an open position by means of the biasing force of a spring 26. A dust hood 28 covers the outer end portions of the push-button 19 and is secured in a metal ring 27 to protect the switch. This structure is carried on the first closed cup-shaped housing 21 such that a threaded portion of the housing 21 may be placed through an opening in a supporting wall of a vehicle and the metal ring 20 threadingly engaged with the threaded portion of the housing 21 to secure the switch in position on the vehicle. In operation, when the push-button contact system 19 is depressed, such as by exerting pressure on the anti-dust hood 28, the movable contact 25 will engage the terminal contacts 16, 17 and 18 thereby completing the circuit to the indicator or warning lamps 2 to insure they are operable.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. In an electrical control system for a machine having an electrical circuit including a battery, a normally open switch which is closed to initiate machine operation and coupled in series with the battery, a series connected normally closed switch which is opened upon initiation of machine operation, a plurality of warning lamps coupled in parallel with the battery and each of which is operably connected to a sensor for generating a control signal effective to illuminate one of said warning lamps for displaying a visual indicator signal, and a testing system for displaying the operability of each of the warning lamps during machine operation, the improvement comprising a plurality of diodes each one of said plurality mutually exclusively electrically coupled in series to one of said plurality of warning lamps and to one terminal of a plurality of normally open function control switches actuable to a closed current-coupling position in response to a control signal from said sensor to illuminate said one warning lamp of said plurality, and a normally open test switch electrically coupled in parallel to said normally closed switch and in series with said plurality of diodes, actuable into a closed current-coupling position to simultaneously electrically couple all of said diodes to the battery for simultaneously illuminating said plurality of warning lamps.

2. The apparatus of claim 1 wherein said plurality of function control switches are electrically coupled in parallel with each other and in series with said battery.

3. The apparatus of claim 1 wherein said normally open test switch includes an electrical conductor extending adjacent a terminal associated with each one of said plurality of diodes to couple a source of electrical current thereto upon the closing thereof.

4. The apparatus of claim 1 further including housing means for containing at least a portion of the electrical circuit and means for securing said housing means to a support wall.

5. The apparatus of claim 4 further including a push-button operatively connected to said normally open test switch to effect actuation thereof.

* * * * *